UNITED STATES PATENT OFFICE.

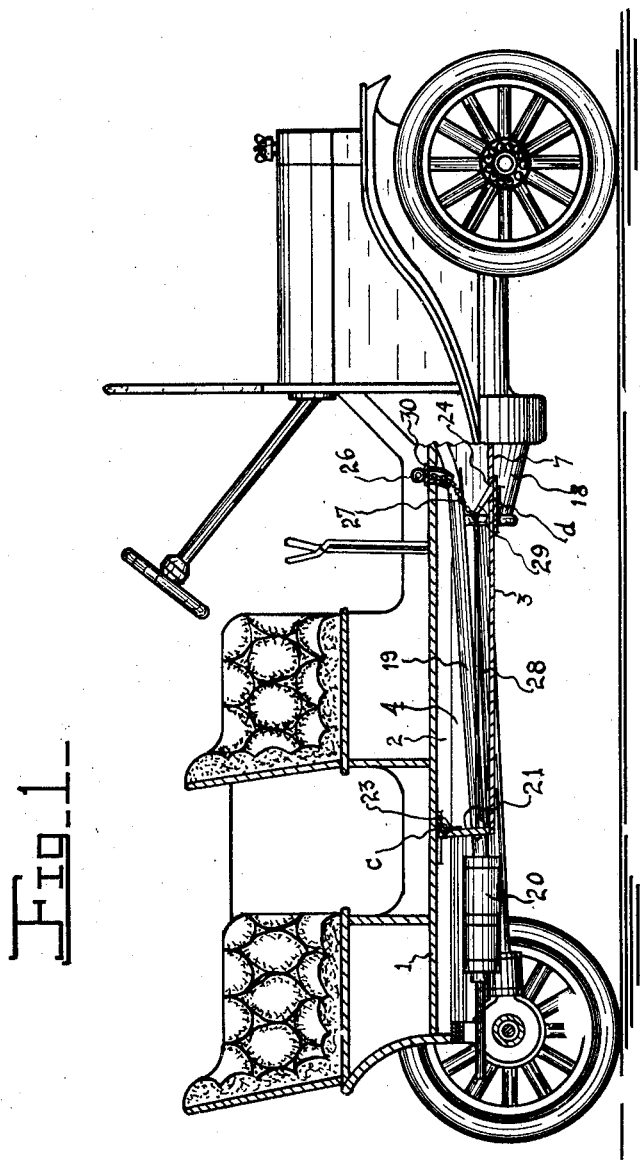

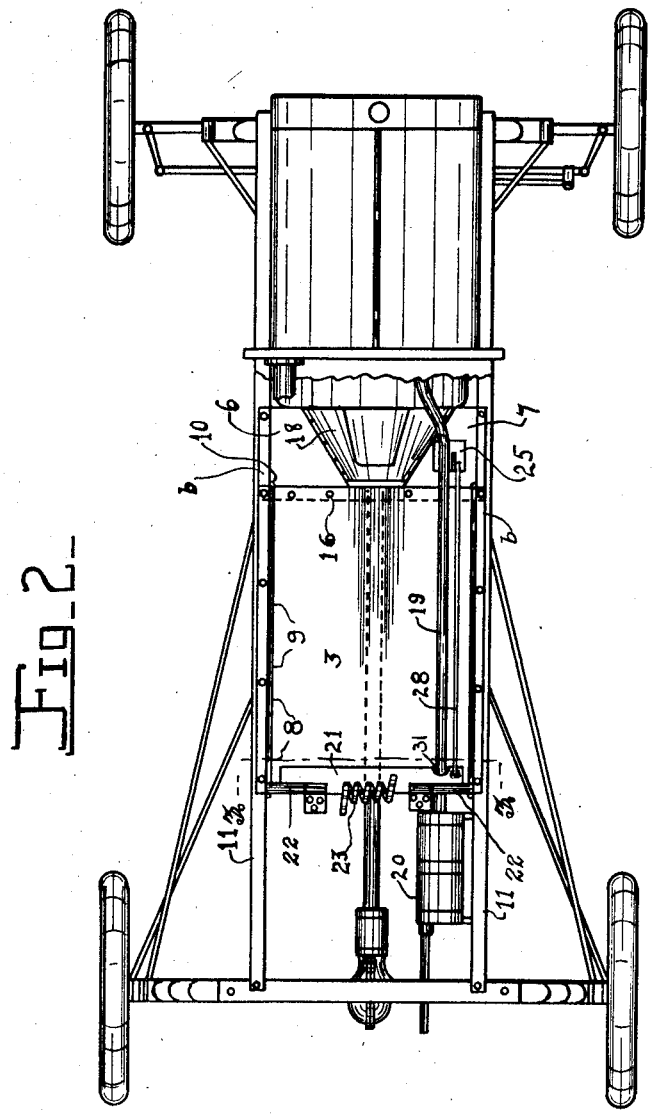

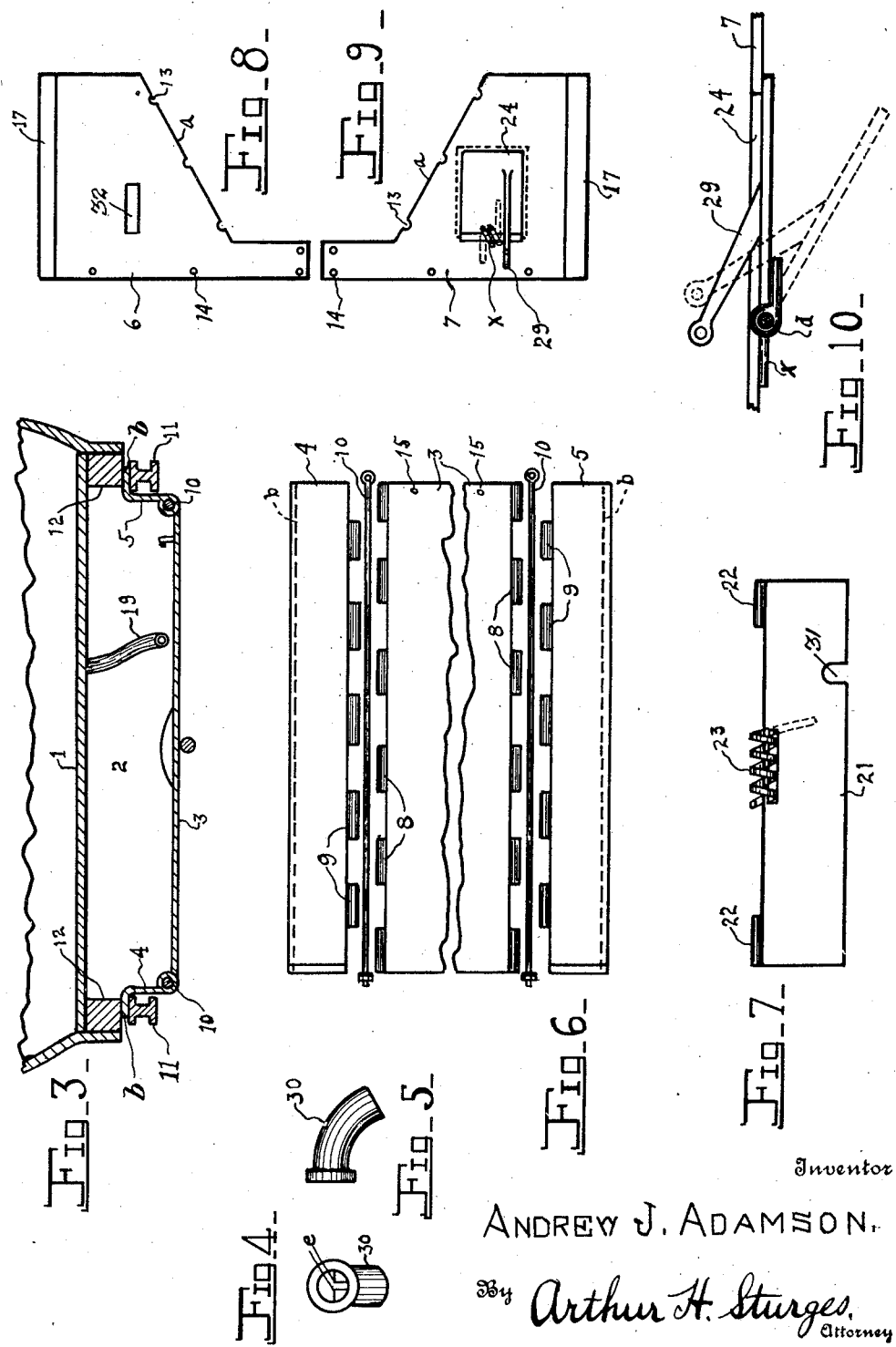

ANDREW J. ADAMSON, OF WINNER, SOUTH DAKOTA.

AUTOMOBILE-HEATER.

1,340,314.  Specification of Letters Patent.  Patented May 18, 1920.

Application filed December 20, 1919. Serial No. 346,376.

*To all whom it may concern:*

Be it known that I, ANDREW J. ADAMSON, a citizen of the United States, residing at Winner, in the county of Tripp and State of South Dakota, have invented certain new and useful Improvements in Automobile-Heaters, of which the following is a specification.

This invention relates to an improvement in automobile heaters, and has for its object to provide a heating chamber below the floor of the automobile for utilizing the radiated heat from the engine and exhaust pipes, for the comfort of the driver and passengers, and to modify the temperature of the storage space of automobile trucks.

The invention has reference to a means for controlling certain air passages for the compartments, so that the degree of heat therein may be changed when desired, and includes the use of structural parts so arranged that they will not be obtrusive to the operating mechanism of an automobile, may be conveniently applied, or removed and may be manufactured at moderate expense.

With the foregoing objects in view and others to be hereinafter mentioned, the invention presents a novel construction, combination and arrangement of parts as described herein and claimed, and as illustrated in the accompanying drawing, wherein,—

Figure 1 is a view in longitudinal section through a part of an automobile embodying the invention.

Fig. 2 is a plan view of an automobile, the body being removed to show the connected plates which form a part of the bottom of the compartment.

Fig. 3 is a transverse section on line 3—3 of Fig. 2.

Figs. 4 and 5, respectively, are front and side views of a tubular chain-holder for the floor of an automobile.

Fig. 6 is a broken away view of disassembled plates for that part of the bottom of the compartment shown in Fig. 3.

Fig. 7 is a side view of an end door for the compartment.

Fig. 8 and Fig. 9 are plan views, respectively, of "left" and "right" wings which form the parts of the bottom, at the front end, of the heating compartment.

Fig. 10 is a detail view showing a control for an air intake to the compartment.

Referring now to the drawings, I provide below the floor 1 of the automobile, as best shown in Fig. 3, a compartment 2 for the storage of heat, and through which heat may pass under control of certain devices, said compartment consisting of a secondary floor or bottom which may be constructed to advantage of sheet metal and consisting of the sheets or plates 3, 4, 5, 6 and 7, so formed and connected that they may be applied to automobiles at any time and, comparatively, at a limited expense.

In order that the compartment or heating chamber 2 may have a suitable width and that it may be conveniently applied to the automobile frame, the rectangular plate 3 has a width substantially equal to the width of the automobile frame, the edges of such plate 3, being provided with loops or hinge-members 8 as best shown in Fig. 6, the elongated plates 4 and 5 each being bent to form a horizontal flange *b* at one longitudinal edge, the opposite edge being provided with hinge-members 9.

The bottom for the rear part of the compartment may be quickly placed in position, pintles or rods 10 traversing the hinge members above mentioned, after the flanges *b* have been inserted between the side bars 11 of the automobile frame and the sills 12 of the vehicle body, the parts 3, 4 and 5 thus connected, being conveniently removable if, for any reason, removal is required, and providing a secondary floor substantially parallel with the floor of the vehicle.

The bottom for the front part of the compartment consists of the wings, plates or sheets 6 and 7, each having recesses 13 formed in their inner edges *a*, and provided with suitable apertures 14 which may register with apertures 15 of the plate 3 for receiving keepers or bolts 16, as shown in Fig. 2, for connecting said plates 6 and 7 with said plate 3. Numerals 17 indicate flanges of the plates 6 and 7 which engage between the frame members 11 and 12. The edges *a* conform to the shape of the transmission casing 18 and abut against said casing, and the recesses 13 are adapted to receive the projections, rivets or bolts with which the casing is generally provided.

Numeral 19 indicates the exhaust pipe which traverses the compartment, and by the construction provided, the compartment may occupy a considerable area, its rear end being disposed adjacent to the muffler 20 and its front end terminating at the rear end of the engine.

It will be appreciated that the structural parts are few, and are so arranged that they may be readily applied to any automobile or motor truck of ordinary construction, but the device would not be practical in use to conform to conditions of seasonable weather or climate unless a suitable control for the heat was provided. This control consists, in part of a door 21 having its upper edge provided with hinge-members 22, and adapted to have a pivotal mounting at $c$ upon the lower side of the floor, as best shown in Fig. 1, its downward swinging movement, actuated by the spring 23, causing it, normally, to close the rear end of the compartment, said rear end when open operating as a discharge aperture for said compartment.

Numeral 24 indicates an intake aperture formed in the wing or plate 7, and as best shown in Figs. 1 and 10, a door 25 pivoted at $d$ is adapted, normally, to remain closed by operation of the spring $x$. Numeral 26, above the floor (Fig. 1) indicates the ring of a flexible strand or chain 27, the lower end of the chain being connected with a pull-rod 28 which is suitably attached to the door 21, said chain also being connected with the arm 29 of the door 25. The chain is disposed in the curved holder or sleeve 30 which is mounted in the floor of the automobile, and when it is desired to permit the heat to pass out of the compartment, the chain may be pulled upwardly and caught between the lugs $e$ (Fig. 4) of the holder, for maintaining the doors 21 and 25 in open positions to permit air from the atmosphere to pass within the compartment from the door 25 and to freely circulate, and operating to reduce the temperature, and as is obvious, by releasing the chain from the projections $e$, both of the doors will automatically close, this being the only operation when it is desired to obtain the advantages of heat.

Numeral 31 indicates a recess opening on the lower edge of the door 21, within which the exhaust pipe may be disposed when said door is closed. Numeral 32 (Fig. 8) indicates an aperture within which the brake lever may be disposed.

While I have shown and described construction in detail I do not wish to be understood as limiting myself to exactness in this respect, nor to form, size or proportion of parts since the scope of the invention is determined by the appended claims.

I claim:

1. An automobile heater comprising a casing adapted to be secured beneath the floor of an automobile and opening at its forward end into the engine space beneath the hood, a normally closed door at the rear end of the casing adapted to trap heated air from the engine in the casing and against said floor of the automobile to heat the body thereof, a normally closed door in the bottom of the casing at the forward end thereof having its rear end hinged to the casing to permit the door to swing down beneath the casing bottom and from a deflector for directing cool air from the outside atmosphere into the casing, and means for simultaneously opening both of said doors for liberating the entrapped heated air and creating a cooling draft through the casing to mingle with and rapidly carry off the heated air from the engine.

2. An automobile heater casing including side plates adapted to be secured beneath the opposite sides of an automobile body, a bottom plate, forward plates extending from the bottom plate to the lower part of the engine for directing heated air from the engine into the casing, a door suspended from the automobile for closing the rear end of the casing and entrapping the heated air, and means for detachably securing the bottom plate to the side plates whereby upon removal of the bottom plate access may be readily had to the under side of the body for adjustments and repairs.

3. In an automobile heater, a pair of side plates having attaching flanges at their upper edges for securement to the bottom of the automobile and having hinge parts along their lower edges, a door hinged to the bottom of the automobile at the rear ends of the side plates, a bottom plate fitted between the side plates and having hinge parts adapted to intermesh with the hinge parts of the side plates, removable pintle rods adapted to be engaged through the intermeshing hinge parts for removably holding the bottom plate in position to form a casing, forward plates detachably secured to the bottom plate and adapted to be secured to the bottom of the automobile near the lower part of the engine for directing heated air from the engine into the casing, a normally closed door carried by one of the forward plates and adapted to be opened downwardly for directing air exteriorly of the engine space into the casing, and means for opening both of said doors for creating a draft through the casing to carry off the heated air from the casing and the engine.

In testimony whereof, I have affixed my signature in presence of two witnesses.

ANDREW J. ADAMSON.

Witnesses:
 D. A. SINCLAIR,
 C. E. ANDERSON.